Aug. 18, 1964  R. E. BENDL  3,145,042
RELEASABLE CARGO COUPLING
Filed Jan. 16, 1962  2 Sheets-Sheet 1
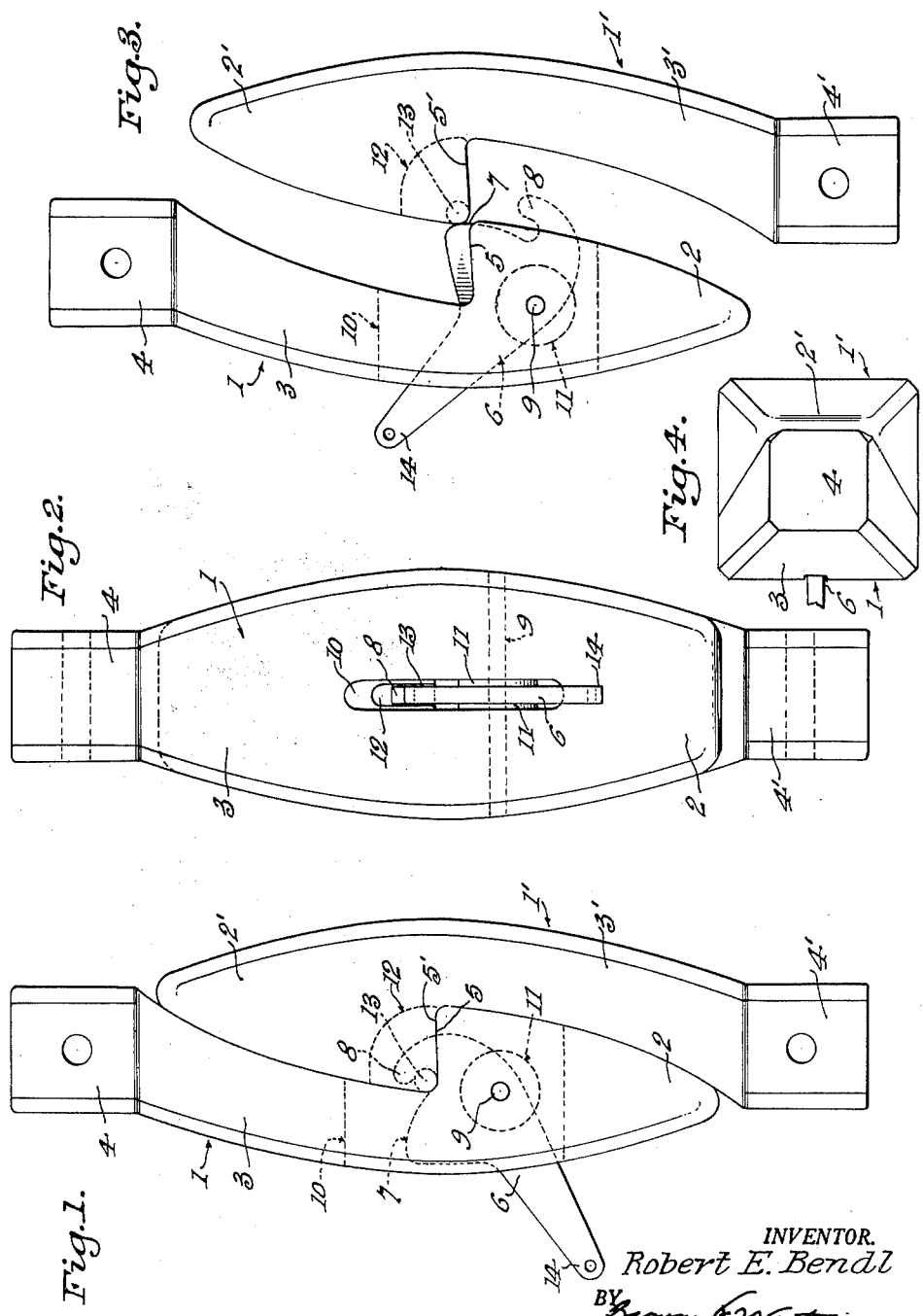
INVENTOR.
Robert E. Bendl
BY
ATTORNEYS Aug. 18, 1964  R. E. BENDL  3,145,042
RELEASABLE CARGO COUPLING
Filed Jan. 16, 1962  2 Sheets-Sheet 2
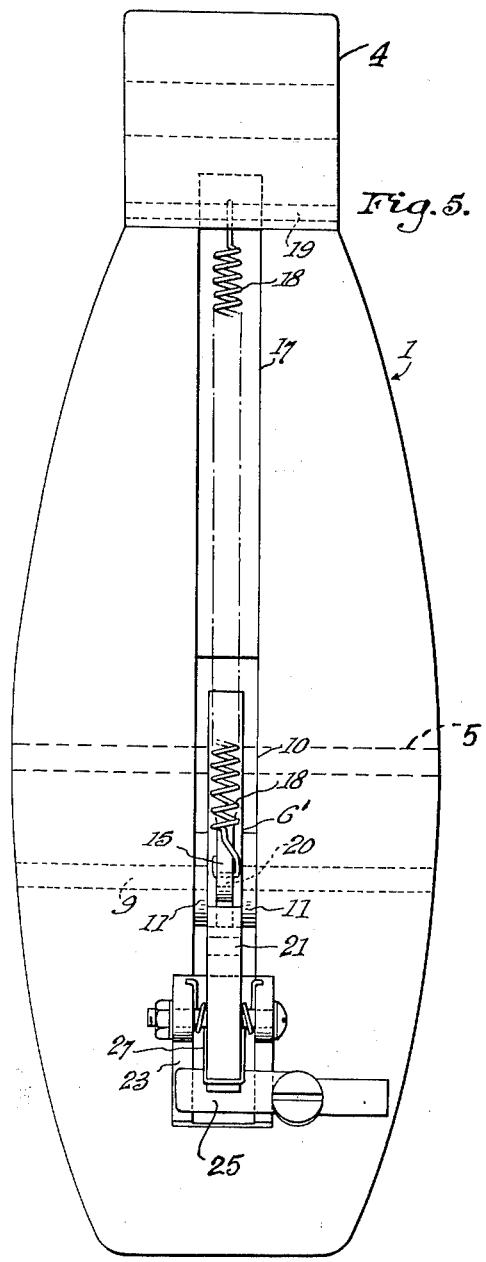
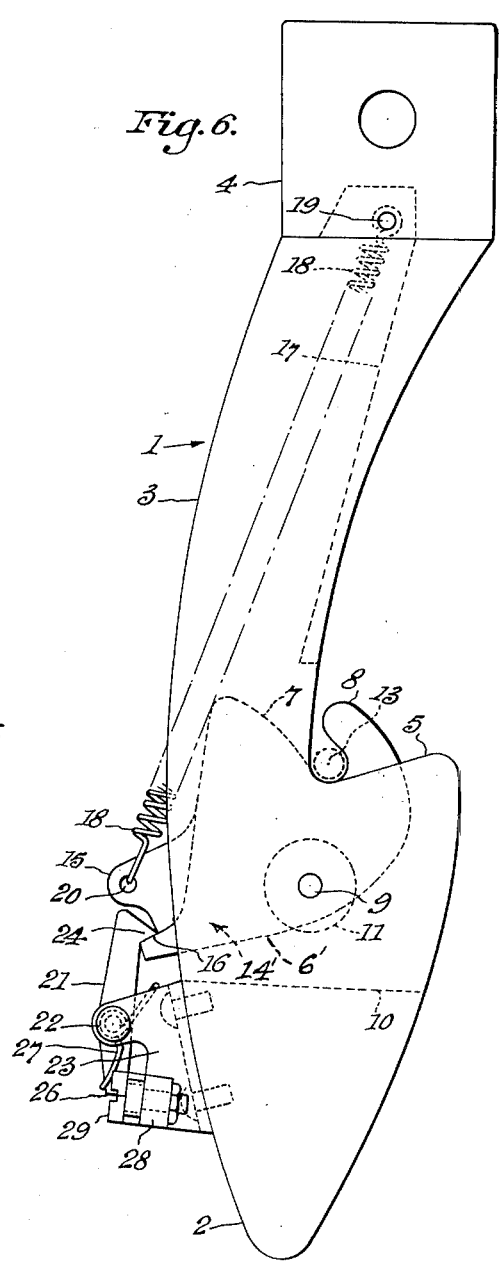
INVENTOR.
Robert E. Bendl
BY
ATTORNEYS

United States Patent Office 3,145,042
Patented Aug. 18, 1964

3,145,042
RELEASABLE CARGO COUPLING
Robert E. Bendl, Grafton Ct., R.F.D. 2, Denbigh, Va.
Filed Jan. 16, 1962, Ser. No. 166,437
6 Claims. (Cl. 294—83)
(Granted under Title 35, U.S. Code (1952), sec. 266)

The invention described herein may be manufactured and used by or for the Government for governmental purposes without the payment of any royalty thereon.

The present invention relates to the field of cargo hooks or coupling, more particularly to a releasable cargo coupling designed for the quick release of a load which has been lowered to the ground by a parachute or a helicopter.

The air supply of troops during a combat operation with parachute dropped materiel or helicopter carried materiel creates many risks for the personnel involved if there is delay in separating the loads from the parachutes or from the helicopter which carries them. If they are under fire, the personnel who retrieve the loads may be subjected to heavy casualties. In the case of a helicopter, the crew and the machine itself will likewise be exposed to injury. Even when there is no risk of casualties, tactical efficiency dictates that the recovery of air dropped loads and helicopter-carried loads be as rapid as possible. It is imperative therefore that any coupling which secured an air dropped load to a parachute or which secures a sling carried load to a helicopter must, by automatic or simple manual operation, release the load promptly after it strikes the ground.

An object of this invention is to provide an improved releasable cargo coupling for use with an air dropped or helicopter carried load which may be adapted for automatic release or for quick manual release of the load when it reaches the ground.

Another object of this invention is to provide particular locking and automatic disengagement means to be used with the before-mentioned releasable cargo coupling which will render the coupling more secure during periods when the load is likely to be dislodged and which will cause the hook to open or separate automatically when the load reaches the ground.

The advantages inherent in the releasable cargo coupling of the present invention and the other uses to which it may be put will be apparent from the attached drawings and the description which follows. For example, it is obvious that the present invention lends itself to cargo pickups, to cargo transfers between ship and ship, and ship and shore, and to civilian as well as military uses.

In the accompanying drawings:

FIG. 1 is a side elevation of one embodiment of the releasable cargo coupling of the present invention showing the two connector blocks in their fully engaged position;

FIG. 2 is a front elevation of the releasable cargo coupling shown in FIG. 1;

FIG. 3 is another side elevation of the releasable cargo coupling of FIG. 1 showing the connector blocks in a separated position;

FIG. 4 is a top plan view of the releasable cargo coupling shown in FIG. 1; and

FIGS. 5 and 6 are front and side elevations, respectively, of one half of a modified form of the releasable coupling; these figures show the connector block which carries the cam lever.

Referring to FIGS. 1–4 of the drawings, the releasable cargo coupling comprises connector blocks 1 and 1' which are similarly shaped and which have heads 2 and 2' and shanks 3 and 3'. Connector block 1 is provided with butt end 4' by which it is attached to the cable or other supporting means which is in turn attached to the parachute or helicopter. Connector block 1' has a similar butt end 4' by which it is attached to the cable or other means which is fastened to the load. Connector blocks 1 and 1' are cut back to form corresponding transverse ledges 5 and 5' at the point where the head of each connector block joins the shank. The connector blocks are so shaped that when they are united as in FIG. 1, a line between the centers of butt ends 4 and 4' would intersect transverse ledges 5 and 5' at or near their centers. When the cargo hook is in its normal carrying condition, connector block 1 is uppermost and the weight of the load is transmitted through ledge 5' of connector block 1' to ledge 5 of connector block 1. Thus the transverse ledges must be so cut that they form a substantially horizontal plane as shown in FIG. 1 in the normal carrying position or they may be cut so their interior portions are somewhat deeper than their exterior portions as most clearly appears in FIG. 6. Obviously there will be a lesser tendency for the connector blocks to slide apart if the load oscillates when the inclined ledges shown in FIG. 6 are utilized. A cam lever 6 having a camming surface 7 and hook 8 is pivotally mounted about pin 9 in slot 10 formed in connector block 1. Washers 11 space cam lever 6 from the walls of slot 10 and facilitate movement of the cam lever. Connector block 1' is provided with slotted recess 12 which may be narrower than but which registers with slot 10 for receiving the hook 8 of cam lever 6. Latching pin 13 is mounted in connector block 1' across slotted recess 12 at a point near the outer end of transverse ledge 5'. Cam lever 6, camming surface 7, hook 8, and latching pin 13 are so designed and so located with respect to each other that when the outer end of cam lever 6 is moved downward, hook 8 engages latching pin 13 and draws the two connector blocks together as shown in FIG. 1 and when the outer end of cam lever 6 is moved upward, camming surface 7 bearing against pin 13 forces the two connector blocks apart as shown in FIG. 3. Thus cam lever 6 and latching pin 13 perform a dual latching and separating function.

Although it is contemplated that the releasable cargo coupling of the present invention will normally include further cooperating elements, it should be apparent that the coupling insofar as it has already been described does have some practical utility. For example, the coupling shown in FIGS. 1–4 might be used in the delivery of helicopter carried loads to the ground. A pull cord may be attached to the outer end 14 of cam lever 6, the other end of the pull cord being located within the helicopter preferably where it can be operated by the pilot. The helicopter takes off either carrying the load hanging beneath it from a sling which includes the hook joined as shown in FIG. 1 or else the crew of the helicopter carefully lowers the load to a point beneath the helicopter before arriving at the destination. During flight, connector blocks 1 and 1' are held together primarily by the weight of the load; however, the latching action of cam lever 6 will resist any transient tendency of the connector blocks to part. When the craft arrives at the delivery point and the pilot descends to a point where the load contacts the ground, the connector blocks may have a tendency to uncouple themselves, there being no pressure at transverse ledges 5 and 5' tending to hold the connector blocks together. With the load on the ground, the pilot or a crew member may pull the cord attached to outer end 14 of cam lever 6. The action of camming surface 7 against pin 13 will force connector blocks 1 and 1' apart so that the helicopter may fly away having discharged its load without any assistance from personnel on the ground.

Additional elements may be combined with the releasable cargo coupling of FIGS. 1–4 if it is to be used with parachute dropped loads and if it is to be used most efficiently with helicopter carried loads. For such uses it is desirable that connector block 1 be equipped with some form of positive locking means which will lock the outer end 14 of cam lever 6 in a down position (thus insuring the engagement of hook 8 about latching pin 13) during unstable conditions when the load does not exert a uniform downward force upon engaged transverse ledges 5 and 5'. As part of, or in addition to such locking means, means should also be provided to effect automatic disengagement of connector blocks 1 and 1' at the moment the load strikes the ground.

FIGS. 5 and 6 illustrate a modification of connector block 1 equipped with such locking and automatic disengagement means. The complementary connector block 1' used with connector block 1 of FIGS. 5 and 6 is similar to the connector block 1' shown in FIGS. 1–4. The differences between connector block 1 of FIGS. 5 and 6 and connector block 1 of FIGS. 1–4 should be clear from the drawings; nevertheless the highlights will be described. The cam lever 6' of the connector block shown in FIGS. 5 and 6 has a somewhat different shape, its outer end 14' being provided with a projecting ear 15 and a locking surface 16. Channel 17 is formed in the shank of connector block 1 and extends into butt end 4 at one extremity and into slot 10 at the other. Tension spring 18 is received in channel 17 and is secured to butt end 4 by pin 19 and to projecting ear 15 by hooking its other end through hole 20. As may be seen from the drawing, tension spring 18 is so positioned that it tends to urge the other end 14' of cam lever 6' upward.

Cam lever 6' is held in a locked position against the force of tension spring 18 by sear lever 21 which is pivotally mounted on pin 22, pin 22 being carried in a bracket 23 which is itself bolted to connector block 1. When sear lever 21 is in its locking position, hook-shaped detent 24 formed at one end of the sear lever engages locking surface 16 of cam lever 6'. The sear lever is held in its locking position by slidable trigger plate 25 which engages and supports the other end 26 of the sear lever. Torsion spring 27 is so placed that when the support of slidable trigger plate 25 is removed, end 26 of the sear lever is caused to rotate in a counterclockwise direction (as seen in FIG. 6) about pin 22, disengaging detent 24 from locking surface 16.

The trigger plate 25 may be actuated in various ways depending upon the use to which the releasable cargo hook is put.

The connector block 1 of FIGS. 5 and 6 is provided with a spring driven timer 28 wound by slotted head 29 which after passage of the timed interval removes the slidable trigger plate 25 from its supporting position under end 26 of sear lever 21. This timer is of a conventional type such as a commercially sold flash bulb timer and it has its own initiating means described hereafter, to start the timing cycle.

The method of employing a releasable cargo hook including a connector block similar to that shown in FIGS. 5 and 6 with a parachute dropped load will first be outlined. The load is attached to butt end 4' of block 1', the parachute is attached to butt end 4 of connector block 1. Before the drop is made, the connector blocks are fitted together. Spring driven timer 28 is wound and the outer end of cam lever 6' is pushed downward so that hook 8 engages pin 13. Sear lever 21 is rocked to a position where detent 24 locks cam lever 6' and slidable trigger plate 25 is placed under the other end 26 of sear lever 21 to support the sear lever in place. A wire which is fastened at one end to a parachute shroud near the canopy is attached at its other end to the initiating mechanism of the spring driven timer. The load is then dropped from the aircraft; the parachute is caused to open by any suitable means such as a static line. When the parachute is opened, its nylon shrouds stretch sufficiently so that the previously described wire is pulled starting the timing mechanism. After the prescribed time, e.g. thirty seconds, elapses, the spring driven timer 28 causes the slidable trigger plate 25 to be disengaged from sear lever 21. The sear lever snaps away from its position against locking surface 16. Thenceforth, tension spring 18 exerts a continuous force on the outer end 14' of cam lever 6' urging it upward. However the weight of the load on transverse ledges 5 and 5' resists this tendency of tension spring 18. At the instant the load strikes the ground and its downward force on transverse ledge 5 is removed, the two connector blocks fly apart, tension spring 18, camming surface 7 and latching pin 13 cooperating in this separation action.

From the foregoing description, it is seen that connector blocks 1 and 1' are securely locked together (by engagement of sear lever 21 and cam lever 6') during the critical period which encompasses the dropping of the load, the opening of the parachute and the next 30 seconds when the load is subject to wild oscillations. During this time if the connector blocks were not locked together by a positive locking means they would probably disengage. Once the parachute and the load is descending at a relatively constant speed and without undue oscillation, the cam lever is automatically unlocked and the releasable cargo hook is in an "armed" condition ready for instant automatic disengagement when the load strikes the ground. This quick automatic disengagement not only facilitates recovery of the load by ground troops but also protects the load from damage which it might suffer if it were dragged over the ground by the parachute.

When the instant releasable cargo hook is used with a load carried slung beneath a helicopter, the spring driven timer 28 may be dispensed with. One end of a manual actuating wire should be secured to trigger plate 25; the other end of the wire should be inside the helicopter where it may be pulled at the proper time by a crew member or the pilot. During flight, cam lever 6' is held in a locked position by sear lever 21. Thus the vagaries of air currents or sudden maneuvers by the pilot will not cause connector blocks 1 and 1' to become separated and the load lost. Shortly before the load is to be set down, the actuating wire is pulled causing slidable trigger plate 25 to move from its supporting position under end 26 of sear lever 21. The sear lever pivots unlocking cam lever 6' which is then in an "armed" condition. When the load contacts the ground, connector blocks 1 and 1' are again free to separate through the cooperation of spring 18, camming surface 7, and pin 13. If necessary, a load suspended from a helicopter by the instant releasable cargo hook may be readily jettisoned. To drop the load the pilot or a crew member must pull the actuating wire which will cause cam lever 6' to be unlocked. The pilot may then jettison the load by maneuvering the helicopter to cause transverse ledges 5 and 5' to be relieved of the weight of the load. From the foregoing, it is clear that the releasable cargo coupling having a connector block 1 equipped with locking means and automatic disengagement means such as shown in FIGS. 5 and 6 is safer and more versatile than the simple cargo hook shown in FIGS. 1–4. The possibility of accidentally dropping a load during a long flight is eliminated by the positive locking means and the speed and ease of landing the load is enhanced by the automatic disengagement means.

From the foregoing description, it should be apparent that the releasable cargo couplings shown in the drawings may be modified in a number of ways and adapted to a number of other uses without departing from the principle of this invention.

I claim:

1. A construction for a separable cargo coupling for quick separation of a load from a carrier comprising first and second interengaging connector blocks for connection respectively to a load and a carrier, said first and second connector blocks each including a comating notched portion which includes a transverse ledge, the notched portion of said first connector block including recessed transverse bar means and said second connector block including recessed lever means having a cammed surface terminating in a hook, said cammed surface and hook of said lever means coacting with said transverse bar means upon interengagement of said first and second connector blocks to maintain said notched portions of said first and second connector blocks in interlocking engagement and release means operable to rotate said lever means urging said cammed surface into contact with said transverse bar moving said transverse bar out of engagement with said hook whereby said first and second connector blocks are separated.

2. A coupling for supporting a cargo load from an airborne carrier comprising a pair of comating blocks respectively connectible to said carrier and said load and notched to provide mutually engaging ledges extending transversely of said blocks intermediate the length thereof, said blocks having longitudinally extending slots intersecting said ledges, a pin fixed in one of said blocks and extending across the corresponding slot adjacent the associated ledge, a pivot pin extending transversely of the slot in the other of said blocks, a lever disposed in the slot in said other block and rockably mounted on said pivot pin, said lever projecting at one end from the side of said block opposite the notched side and having at its other end a cam and hook formation engageable with the pin in said one block to lock said blocks together when said lever is rocked in one direction and urge said blocks apart when said lever is rocked in the other direction, and means connected to said one end of said lever for rocking said lever in said other direction when said coupling is relieved of load.

3. A coupler for supporting a cargo load from an airborne carrier comprising a generally symmetrical block adapted to be connected at one end to the carrier and at the other end to the cargo load and including two similar parts each notched in one face to provide a transversely extending ledge, the ledges on the two parts being mutually interfitting and beveled to resist separation of said parts as long as said block is under load, a lock element fixed in one of said parts and spanning a recess in said one part, a lock lever mounted in a recess in the other of said parts and engageable when in one operative position with said lock element to lock said parts together, and means connected to said lever for moving said lever away from said one operative position to release said block parts for separation when said block is relieved of load.

4. A coupler for supporting a cargo load from an airborne carrier comprising a generally symmetrical block adapted to be connected at one end to the carrier and at the other end to the cargo load and including two similar parts each notched in one face to provide a transversely extending ledge, the ledges on the two parts being mutually interfitting and beveled to resist separation of the parts as long as said block is under load, a lock element fixed in one of said parts and spanning a recess in said one part, a lock lever mounted in a recess in the other of said parts and engageable in one operative position with said lock element to lock said parts together, spring means connected to said lever to move said lever away from said one operative position to release said block parts for separation when said block is relieved of load, and time delay means engaging said lever and effective to temporarily render said spring means inoperative to move said lever.

5. A quick releasable coupling for releasing a suspended load from a carrier comprising a pair of interengaging connector blocks connected one to the carrier and the other to the load, each of said connector blocks having a transverse ledge intermediate its length, the said connector blocks when interengaged mutually forming smooth, unitary surfaces on all sides, latching and separating means for selectively securing the blocks together and forcibly disengaging said blocks from each other, said means comprising a cam lever, pivotally mounted in one of said blocks and having a hook and a camming surface, and a hook engaging means mounted in the other of said connector blocks whereby upon rotation of said cam lever in one direction the said hook and said hook engaging means cooperate to couple the connector blocks together and upon rotation of said cam lever in the opposite direction the said camming surface and said hook engaging means cooperate to forcibly separate the said connector blocks, locking means for selectively locking and unlocking the said cam lever after it has been put in a latched condition comprising a sear lever pivotally mounted on the same connector block as the cam lever, the said sear lever having a detent for locking said cam lever in a latched condition, a trigger plate adjacent to said sear lever for selectively restraining and releasing the sear lever, resilient means which moves the detent of said sear lever away from its locking contact with said cam lever when the trigger plate is moved; and resilient means affixed to said cam lever for causing the cam lever to rotate and so to actuate the separating means when the weight of the load is taken off said connector blocks.

6. A quick releasable coupling for releasing a suspended load from a carrier comprising a pair of interengaging connector blocks connected one to the carrier and the other to the load, each of said connector blocks having a transverse ledge intermediate its length, the said connector blocks when interengaged mutually forming smooth, unitary surfaces on all sides, latching and separating means for selectively securing the blocks together and forcibly disengaging said blocks from each other, said means comprising a cam lever pivotally mounted in one of said blocks and having a hook and a camming surface, and a hook engaging means mounted in the other of said connector blocks whereby upon rotation of said cam lever in one direction the said hook and said hook engaging means cooperate to couple the connector blocks together and upon rotation of said cam lever in the opposite direction the said camming surface and said hook engaging means cooperate to forcibly separate the said connector blocks, locking means for selectively locking and unlocking the said cam lever after it has been put in a latched condition comprising a sear lever pivotally mounted on the same connector block as the cam lever, the said sear having a detent for locking said cam lever in a latched condition, a trigger plate adjacent to said sear lever for selectively restraining and releasing the sear lever, resilient means which move the detent of said sear lever away from its locking contact with said cam lever when the trigger plate is moved, resilient means affixed to said cam lever for causing the cam lever to rotate and so to actuate the separating means when the weight of the load is taken off said connector blocks, and timer means connected to said trigger plate for automatically moving the trigger plate from restraining engagement with said sear after a predetermined time interval.

References Cited in the file of this patent

UNITED STATES PATENTS

| | | |
|---|---|---|
| 2,413,392 | Veverka | Dec. 31, 1946 |
| 2,682,425 | Staats | June 29, 1954 |
| 2,863,694 | Gross | Dec. 9, 1958 |

FOREIGN PATENTS

| | | |
|---|---|---|
| 143,348 | Great Britain | of 1920 |